United States Patent Office 3,206,883
Patented Sept. 21, 1965

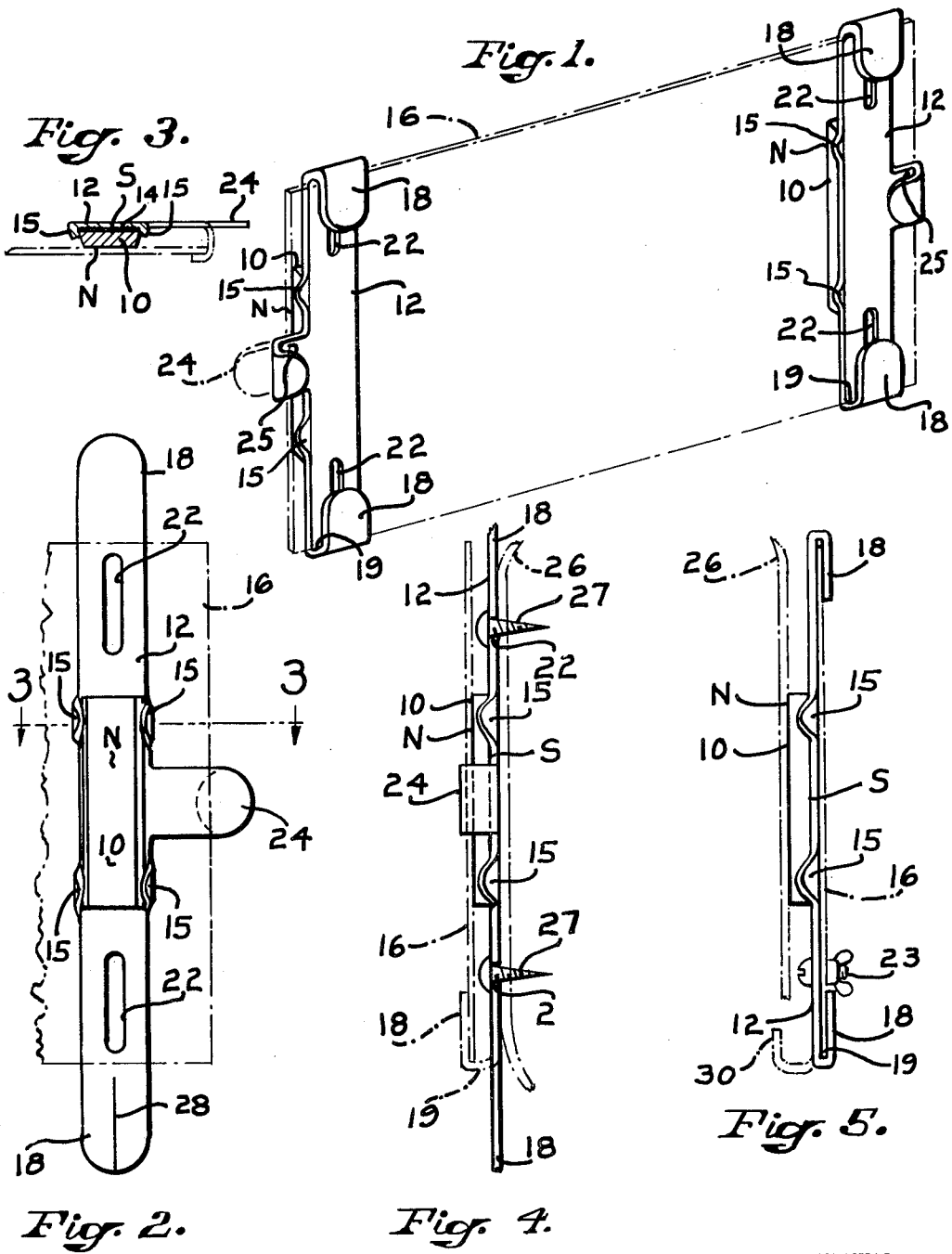

3,206,883
MAGNET UNIT AUTOMOBILE NUMBER
PLATE SUPPORT
Edward L. Crawford, Worcester Road, Princeton, Mass.
Filed May 13, 1963, Ser. No. 279,964
3 Claims. (Cl. 40—209)

This invention relates to a holder for automobile registration number plates.

A standard automobile number plate is made of metal having printed numbers and is usually fastened to the car by means of bolts passing through slots in the plate and secured at the rear on the bumper or a plate holder. At the end of the year, when the plates are to be replaced by new ones, it is often found that through the effects of rust and oxidation or other chemical action it is difficult and often impossible to thread the nuts off the bolts, and drastic action may be required, as by cutting the bolts in two, for removal of the old plate. This entails hardships at least for those living in the northern zones of cold, and many an attempt has been made to revise constructions and provide for ready removability of the old plates and their replacement. As a minor problem, farmers are often permitted to apply the same number plate to one of several tractors which he may be using at different times on the highways. Hence, the ready replacement of the one set of plates on the different tractors is desired.

I have found that an automobile registration number plate may be readily secured on an automobile or tractor by means of a magnet. The primary object of this invention is to provide a simple magnet unit construction having a permanent magnet attached to a holder on the car body, whereby a number plate may be removably held thereby, or the number plate may be fixed on the magnet unit and the assembly removably mounted on an iron or other magnetic surface on the car body by means of the permanent magnet. Further objects will be apparent in the following disclosure:

In accordance with this invention, I secure a magnet on a backing plate or holder, as by means of a thin layer of cement, and thereby provide a magnet unit. This magnet unit may be installed fixedly on a car, and it is so shaped and arranged that a number plate of iron or other magnetic metal may be readily mounted thereon by the mere application of the plate to the influence of the magnetic force. It is also feasible to attach such a magnet unit fixedly to a registration number plate with the magnet facing rearwardly, so that the unit may be quickly applied to any magnetic surface of a tractor or car body on which the number plate is to be displayed. Any body of iron or other substance capable of conducting magnetic flux or lines of force is herein termed a magnetic metal. The magnet units are preferably used in pairs to engage the opposite edge portions of a number plate where they do not obscure the number and serve to mount the plate on an automobile or other vehicle.

Referring to the drawings illustrating embodiments of the invention:

FIG. 1 is a perspective view of two magnet units fixed in spaced relationship by a number plate (dot and dash showing) and which are arranged to be magnetically and removably mounted on a car by means of the magnets located on the opposite sides of the holders from the number plate;

FIG. 2 is a front view of the magnet side of the unit prior to bending the ears of the magnet holder plate into position for locating a number plate thereby;

FIG. 3 is a fragmentary sectional view taken on the line 3—3 of FIG. 2;

FIG. 4 is an end view of the magnet unit fixedly attached to an automobile part, shown in dot and dash lines, and having its bottom and side ears arranged to form grooves or slides for a number plate which is removably located or held in position in the slides by the magnet, and wherein the slides are located on the same side of the holder as is the magnet; and FIG. 5 is a similar view to FIG. 4, but with a bottom ear bent in a direction opposite from the magnet side of the unit, so that the number plate may be mechanically secured to the unit and the assembly removably mounted on an automobile part by means of the magnet.

Referring first to FIG. 2, a magnet 10 is permanently mounted on a strap or holder 12, and preferably by means of a thin layer of a suitable cement 14 (FIG. 3) capable of adhering to metal, and this assembly constitutes a magnet unit which will serve for attaching a number plate to a car. The holder 12 is preferably made of metal, such as a soft steel, and it may be provided with low ears 15 shaped and spaced to fit against the opposite sides of the magnet 10 without interfering with the magnet action, which aid in positioning the magnet against lateral movement. If desired, the magnet 10 may be slightly beveled, as shown in FIG. 3, so as to provide a wedging contact with the inwardly bent ears 15. These ears in the absence of any cement 14 may serve as the sole support for the magnet, but if the plate 12 is made of magnetic material or one capable of conducting magnetism, which attracts the opposed portions of the holder and a number plate and serves to mount both the holder and the plate on an automobile.

The magnet 10 is of the permanent type and made of a suitable material, such as an aluminum nickel cobalt alloy sold under the trademark Alnico. The magnet, as shown, has substantially parallel front and rear faces of rectangular shape and these faces are of opposite polarity, such as indicated by the letters N and S representing North and South poles. These magnets need be only large enough to give adequate holding force to support the automobile number plate 16 against the jolts and jars met in ordinary travel.

The holder 12 of the magnet unit is preferably so constructed of soft steel or other suitable material and so shaped that a number plate 16 may be supported alternatively on either side thereof. In the showing of FIGS. 1 and 5, the number plate 16 is held on the opposite side of the holder 12 from the magnet 10. In the showing of FIGS. 3 and 4, the holder 12 is secured fixedly on an automobile part in position where the magnet is on the outside and arranged for magnetically holding the number plate removably on the unit. To these ends, the holder 12 is made materially longer than the vertical width of the rectangular number plate 16 and its extended ends form ears 18 which are made of a material, such as soft steel, capable of being bent to form channels or slideways of a width for locating or supporting the number plate or of resisting vertical movement as might be caused by some jolt due to an uneven road surface.

These ears 18 may be bent away from the side holding the magnet to provide narrow channels 19 as shown in FIGS. 1 and 5, and in that case the number plate 16 may be held on the two holders 12 solely by means of the ears, or the number plate may be secured to the holder 12 by means of wing nut bolts 23 (FIG. 5) passing through the usual perforations or slots in the plates and the elongated slots 22 (FIG. 1) suitably located near the ends of the holders 12. Also, the plate 12 has ears 24 projecting laterally from the medial portion thereof, and these may be bent inwardly to provide vertical channels or slideways 25 into which the license or number plate may be inserted. One of these ears 18 or 24 may be bent after the number plate has been positioned in the two holders, or the upper ear 18 may be left unbent so that the number plate may be dropped vertically into position. The number plate is thus removable from the magnet holder units at the end of the registration season. Since the magnet is on the back side of the holder in the structures of 1 and 5, the assembly of the number plate and the set of holders 12 may be removably mounted on any magnetic surface, such as the bumper or rumble portion 26 of the automobile. Hence, the plate may be quickly removed from one tractor or car and applied on another, as may be required where a farmer has only one license plate for several tractors herein termed a car or automobile. This construction also applies to a case where a car dealer wishes to demonstrate one of several cars to which the same number plate may be applied.

This invention finds particular utility in the arrangement of FIGS. 3 and 4 in which the magnet unit is mounted fixedly although removably on a car body 26, as by means of bolts or screws 27 or any suitable fastening structure. The side and bottom ears 18 and 24 are bent to form the channels 19 and 25 on the same side of the holder as the magnet 10. These channels are made as wide as the thickness of the magnet added to that of the number plate, to provide a sliding fit, so that the number plate may contact the magnet and be held in position by both the ears and the magnet. The latter prevents vibrations if the number plate fits loosely in the channels. In that arrangement, the upper ear 18 may be left straight, as shown in FIGS. 2 and 4, so that the number plate may be inserted in the magnet unit slideways from the top and held securely in place by means of the magnet.

It will be appreciated that a single large magnet unit may be used in place of the two spaced units shown in FIG. 1, and that this single unit would normally be located centrally on the number plate. The various ears supplement the magnet and prevent the number plate from being dislodged by jolts, although the magnet should be sufficiently strong to hold the number plate immovable during the normal operation of the automobile. Although the magnet units are shown (FIG. 1) in a vertical arrangement they may be arranged horizontally and suitably mounted on or magnetically attached to an iron surface of the automobile. Also the two magnets may be arranged in a reverse polarity so that the north pole on one unit and the south pole on the other unit contact the number plate, or like poles may contact the number plate as is found desirable.

It will thus be appreciated that depending upon the direction in which the ears 18 and 24 are bent, the number plate may be mounted fixedly on the magnet unit for a removable magnetic attachment to an iron or other suitable surface, as is shown in FIG. 5, or the unit may be removably but fixedly mounted on the car and the license plate secured to the unit by the attractive force of the magnet and aided by the slideways or channels on the holder.

It is also desirable, in some cases, to have a double set of bottom and side ears providing slideway channels on the opposite sides of the holder 12, so that the holder may be used without modification in the arrangements of both FIGS. 4 and 5. This may be done by slitting the ears 18 medially and bending the two halves oppositely to form channels on both sides of the unit holder 12, as is indicated by the slit line 28 at the bottom of FIG. 2 and the second bottom channel 30 shown in dotted lines in FIG. 5. The lateral ears 24 may be treated similarly; but if there is interference with a car part, the unused ear may be straightened to get it out of the way.

Various modifications will be readily apparent to one skilled in this art, and it will be appreciated that numerous changes may be made in the structure within the scope of the appended claims.

Having thus described this invention, what I claim as novel and desire to secure by Letters Patent is:

1. A pair of magnet unit holders for an automobile number plate of magnetic metal, each holder comprising a narrow backing plate of magnetic metal which is longer than the width of the number plate and has on its opposite ends two sets of ears shaped to form opposed slide-way channels and intermediate lateral ears forming channels, said ears being arranged to form a set of channels on each side of the holder which are shaped to fit over three edge portions at an end of the number plate, and a permanent magnet attached to one side of a holder between the opposed channels, the channels on the same side as the magnet having widths as wide as the thickness of both the magnet and the number plate so that the magnet may magnetically hold the number plate immovable in the channels, the channels on the opposite side from the magnet being narrow and having widths as great as the thickness of the number plate and shaped to support the same, said number plate being slideably removable in the channels and cooperating to hold the magnet unit holders in a spaced arrangement, each holder having a slot for receiving a fastening device.

2. A pair of magnet unit holders for an automobile number plate of magnetic metal, each holder comprising a narrow backing plate of magnetic metal provided with ears at its ends and an intermediate lateral ear which are shaped to provide narrow channels arranged to fit over three edge portions at an end of the number plate, said number plate serving to space said magnet unit holders and being solely supported by said channels of the two magnet unit holders, and a permanent magnet secured on the opposite side of each backing plate from the channels and arranged to become attached to a magnetic metal portion of an automobile and thus mount the assembly of the number plate and said holders on the automobile.

3. A pair of magnet unit holders for an auomtobile number plate of magnetic metal, each holder comprising a narrow backing plate of a magnetic metal which is longer than the width of the number plate and has ears at its opposite ends shaped to form opposed slide-way channels and an intermediate lateral ear forming a channel, said channels being arranged to fit over three edge portions at an end of the number plate, and a permanent magnet attached to that side of the backing plate which has the channels, said channels having widths as wide as the thickness of both the magnet and the number plate and so arranged that the magnet may magnetically hold the number plate immovable in the channels, said number plate cooperating to maintain the magnet unit holders in a spaced arrangement, and a fastening device for attaching each backing plate to an automobile.

References Cited by the Examiner

UNITED STATES PATENTS

| 1,367,659 | 2/21  | Hollis _____ 40—10 X |
| 1,821,609 | 9/31  | Baker. |
| 2,140,067 | 12/38 | Batcheller _____ 40—209 X |
| 2,741,046 | 4/56  | Kroslak _____ 40—209 |
| 2,752,709 | 7/56  | Cough _____ 40—129 |
| 2,775,832 | 1/57  | Vizza _____ 40—129 X |
| 2,977,082 | 3/61  | Harris _____ 40—142 X |

EUGENE R. CAPOZIO, *Primary Examiner.*

LAWRENCE CHARLES, JEROME SCHNALL,
*Examiners.*